Feb. 24, 1953
W. STEGEMANN
2,629,424
METHOD AND DEVICE FOR APPLYING RUBBER
COATINGS TO FABRIC BANDS
Filed Sept. 25, 1950
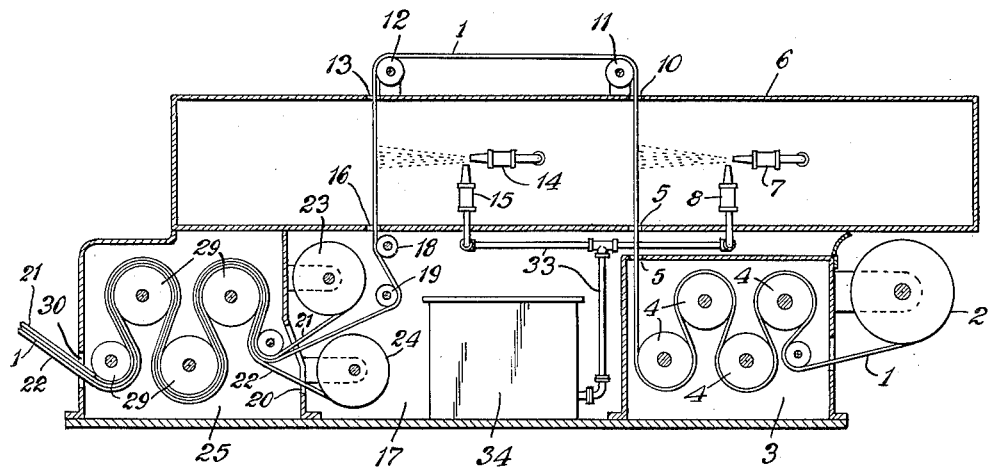
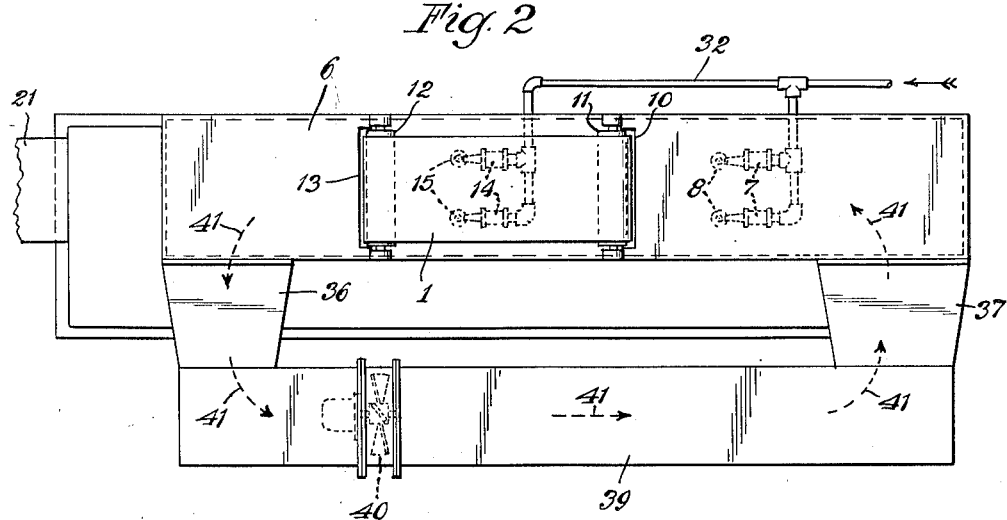
Inventor
Walter Stegemann
by Singer, Stern & Carlberg
Attorneys Patented Feb. 24, 1953

2,629,424

UNITED STATES PATENT OFFICE 2,629,424

METHOD AND DEVICE FOR APPLYING RUBBER COATINGS TO FABRIC BANDS

Walter Stegemann, Hamburg-Harburg, Germany, assignor to Phoenix-Gummiwerke A. G., Hamburg-Harburg, Germany Application September 25, 1950, Serial No. 186,508

2 Claims. (Cl. 154—37)

The invention relates to a method of treating fabrics and constitutes a continuation-in-part of my patent application, Serial No. 77,436, filed February 19, 1949, now abandoned.

More particularly, the invention relates to a method to prepare fabrics or fabric threads for uniting the same with a rubber coating.

It is an object of the invention to treat such fabrics and threads which are employed in the manufacture of conveyor belts which consist of rubber provided with an insert of fabric and are made by applying a rubber coating to one side or both sides of a fabric band.

For the purpose of making fabrics adherable to rubber, it has been proposed heretofore to move the fabrics or the like through a bath consisting of a Desmodur solution, whereby this solution penetrates deeply into the interior of the fabric band. Fabric bands saturated in this manner, however, have to be dried to a certain extent before the rubber layers are applied to them. The purpose of this drying operation is to recover from the solution the valuable solvents such as benzine, gasoline and the like. This recovery method, however, requires the employment of expensive devices.

It is now an important object of the present invention to avoid the employment of expensive devices for recovering the mentioned solvents. According to the present invention the Desmodur solution is applied to the fabric band by means of vaporizing or spraying the solution onto the same. The fine distribution of the solution over the surfaces of the fabric has the advantage that only very small amounts of the solution are required to obtain a sufficient preparation of the fabric band to make the latter receptive for receiving thereon a rubber coating and insuring a good adherence of the rubber coating to the fabric band. It has been discovered that when applying the solution to the fabrics in a very fine distribution as just mentioned, the fabric band is sufficiently treated on the outer layers in order to obtain the desired result that rubber layers will readily and permanently adhere thereto. It is not necessary for the solution to penetrate entirely through the body of the fabric. In fact, such a complete penetration may under certain circumstances result in undesirable technological changes in the material of the fabric. The desired materials for improving the adherence of rubber to fabric layers, even though they consist of solid materials, may be readily converted by a suitable solvent into the form of a highly concentrated solution which when vaporized or sprayed upon the fabric or its construction elements will permit a rubber layer to adhere thereto. Another advantage of the invention is that when employing the method of spraying the Desmodur solution onto the fabric, it is possible to operate with a substantially shorter period of drying before the rubber layers are applied to the fabric.

In the accompanying drawing is illustrated by way of example a device for producing rubber conveyor bands in accordance with the method of the present invention.

Fig. 1 illustrates diagrammatically a side elevation view of the device and

Fig. 2 illustrates diagrammatically a top plan view of the device.

Referring to the drawing, a fabric band 1 such as cotton duck or other material adapted for forming an insert in a conveyor band covered with rubber is unreeled from a supply spool 2 and is passed through a drying chamber 3 where it is conducted over a plurality of rollers 4 before leaving the chamber 3 through an aperture 5 in the top wall of the chamber 3. The aperture 5 is in communication with a spray chamber 6 wherein the fabric 1 is first subjected to a spray of a pair of spraying devices 7 and 8 before leaving the upper end of the chamber 6 through an aperture 10. The fabric band 1 is then conducted over a roller 11 horizontally outside the spray chamber 6 to a roller 12 and then is passed downwardly through another aperture 13 back into the spray chamber 6 wherein now the other side of the fabric band is sprayed with the solution by another pair of spraying devices 14 and 15. The fabric band has now been treated on both sides with the solution and is passed downwardly through an aperture 16 into a chamber 17 for supplying a rubber layer to each side of the fabric layer.

The fabric band 1 is first conducted over tensioning rollers 18 and 19 and then passes through an aperture 20 into a heating chamber 25 together with rubber layers 21 and 22 applied respectively to both sides of said fabric band. The rubber layers 21 and 22 are taken from supply spools 23 and 24 respectively, arranged in the chamber 17. In the drying chamber 25, in which a temperature of about 135° C. is maintained the united layers 1, 21 and 22 are conducted over a plurality of rollers 29 and the finished conveyor band leaves the device through the discharge aperture 30.

The spray devices 7, 8 and 14, 15 of which two pairs are arranged in the spray chamber 6 consist each of an air nozzle 7 and 14 respectively and a Desmodur nozzle 8 and 15 respectively. The nozzles 7 and 14 are supplied with compressed air by an air supply pipe 32, while the Desmodur nozzles 8 and 15 are connected by a pipe line 33 with a tank 34 containing the solution to be applied to the fabric band. The compressed air jet issuing from the nozzles 7 and 14 causes the Desmodur solution to be drawn upwardly in the pipe 33 to be conveyed by the compressed air in finely distributed condition onto the fabric band.

Referring now particularly to Fig. 2, it will be noted that the spray chamber 6 is provided at both ends with laterally extending conduits 36 and 37 both of which are connected to a duct 39 in which is arranged a fan 40 for creating a draft in the direction of the arrows 41, so that the air is continuously kept in circulation through the spray chamber 6.

The tank 34 may contain, for instance a solution consisting of 20% Desmodur in methylene chloride. Desmodurs are bi- and poly-functional isocyanates which are used to advantage in adhesives and have been proven very useful in treating fabric bands of the type used in accordance with the present invention. The conversion of this solution into a fine spray takes place in the spray chamber 6 at room temperature (approximately 20° C.). The composing of the band 1, 21 and 22 in the heating chamber takes place at an elevated temperature of about 135° C., as already mentioned previously. The application of the rubber layers 21 and 22 to the fabric band 1 can take place immediately after the fabric has passed through the aperture 16 without prior drying, because the fabric band has taken up only sufficient solution as is required for a good and permanent adherence of the rubber layers 21 and 22.

What I claim is:

1. In a device for manufacturing a rubber coated fabric band, an elongated spray chamber, means for continuously moving said fabric band through said spray chamber, means including spray nozzles in said spray chamber for applying a fine spray of an adherence promoting liquid to the surface of said moving fabric band, said spray nozzles issuing their spray all in one direction lengthwise of said spray chamber, a duct connecting both ends of said spray chamber with each other, a fan in said duct for circulating air through said duct and said spray chamber in the direction in which the sprays are discharged from said nozzles, two supply spools for rubber layers arranged outside said spray chamber adjacent the point where the treated fabric band leaves the same, means for conducting the rubber layers in engagement with opposite sides of said treated fabric band, and means for pressing said rubber layers during the continuous movement of the fabric band in intimate contact with the latter to form a composite structure.

2. In a device for manufacturing a rubber coated fabric band, an elongated spray chamber, means for continuously moving said fabric band through said spray chamber, means including spray nozzles in said spray chamber for applying a fine spray of an adherence promoting liquid to both sides of said moving fabric band, said spray nozzles issuing their spray all in one direction lengthwise of said spray chamber, a duct connecting both ends of said spray chamber with each other, a fan in said duct for circulating air through said duct and said spray chamber in the direction in which the sprays are discharged from said nozzles, two supply spools for rubber layers arranged outside said spray chamber adjacent the point where the treated fabric band leaves the same, means for conducting the rubber layers simultaneously in engagement with opposite sides of said treated fabric band, and means for simultaneously pressing both said rubber layers during the continuous movement of the fabric band in intimate contact with the latter to form a composite structure.

WALTER STEGEMANN.

REFERENCES CITED

The following references are of record in the file of this patent:

UNITED STATES PATENTS

| Number | Name | Date |
|---|---|---|
| 1,824,690 | Schneider | Sept. 22, 1931 |
| 2,261,445 | Olsen | Nov. 4, 1941 |
| 2,375,261 | Taylor | May 8, 1945 |
| 2,415,839 | Neal et al. | Feb. 18, 1947 |
| 2,499,774 | Perkerson | Mar. 7, 1950 |

FOREIGN PATENTS

| Number | Country | Date |
|---|---|---|
| 9,622 | Great Britain | 1896 |
| 544,324 | Germany | Feb. 17, 1932 |

OTHER REFERENCES

"Polyisocyanates in Bonding," by T. J. Meyrick and T. J. Watts, from Transactions Institute Rubber Industry, page 156 (Cord Fabric), vol. No. 25 (1949).